United States Patent [19]

Hudson, Jr.

[11] 4,240,573
[45] Dec. 23, 1980

[54] METHOD OF BRAZING A PRESSURE VESSEL WITH THERMAL RELEASE PLUG

[75] Inventor: Sharon J. Hudson, Jr., Lambertville, Mich.

[73] Assignee: Sharon Manufacturing Company, Toledo, Ohio

[21] Appl. No.: 727,881

[22] Filed: Sep. 29, 1976

[51] Int. Cl.³ .............................................. B23K 1/12
[52] U.S. Cl. .................................. 228/184; 113/120 S
[58] Field of Search ............... 228/184; 113/120 F, 113/120 S; 220/89 B, 89 A

[56] References Cited

U.S. PATENT DOCUMENTS

| 2,171,588 | 9/1939 | McGuffey | 220/89 B |
| 3,064,608 | 11/1962 | Karmazin | 228/184 X |
| 3,362,063 | 1/1968 | Williams | 220/89 B |
| 4,089,092 | 5/1978 | Jeanguenin et al. | 228/165 X |

Primary Examiner—Kenneth J. Ramsey

[57] ABSTRACT

A fabricated pressure vessel having a heat fusible safety plug. The vessel is made of two or more shell member metalurgically joined together such as by furnace brazing in a protective atmosphere. One of the shell members has a conically shaped well which converges in an inwardly direction and terminates with a small aperture. A lead or other low melting point metal pellet is placed in the well and fused to the well surface during furnace brazing at a temperature greater than twice the melting point temperature of the fusible plug metal.

2 Claims, 7 Drawing Figures

METHOD OF BRAZING A PRESSURE VESSEL WITH THERMAL RELEASE PLUG

SUMMARY OF THE INVENTION

Generally speaking the invention relates to pressure vessels fabricated from sheet metal members which include a thermally releasable metal safety plug. More specifically the invention relates to pressure vessels such as suction accumulators and receivers for use in refrigerant compressing-evaporating systems which vessels are fabricated from two or more sheet metal parts having overlapping seams brazed together in a furnace in a protective atmosphere while simultaneously producing a low melting point safety release plug in the wall of the vessel. To produce the heat fusible plug an inwardly converging frusto conical well is punched in the wall of one of the sheet metal members. The inner tip of the well contains a small aperture or vent. The metal plug is formed in the well and bonded to the conical surface of the well without fluxing agents by placing a low melting metal pellet in the well prior to the seam brazing operation and then carrying out the brazing operation at a temperature that is greater than twice the melting temperature of the plug metal. Apparently the high molecular activity resulting from subjecting the low melting point plug metal to a temperature above the melting temperature of the seam brazing metal scrubs the surface of the conical well and causes impurities to gravitate to the center of the plug and concentrate in a small area on the outside surface of the plug.

Practicing the teachings of this invention enables one skilled in the art to consistently produce reliable safety plugs at a cost that is low enough to make such safety plugs economically available for use in all fabricated pressure vessels even disposable pressure vessels such as aerosol cans and small propane tanks. These and numerous other advantages will become more apparent as the invention is described in greater detail in conjunction with the accompanying drawings.

DETAILED DESCRIPTION OF THE INVENTION

Figure 4:
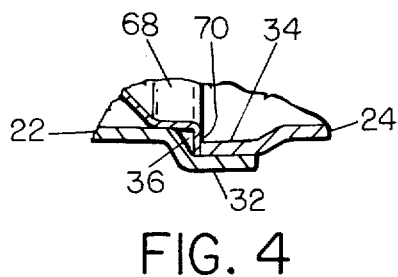
FIG. 4 is an enlarged cross sectional view of the common seal joint between the two vessel sections and the edges of the weir member.
Figure 2:
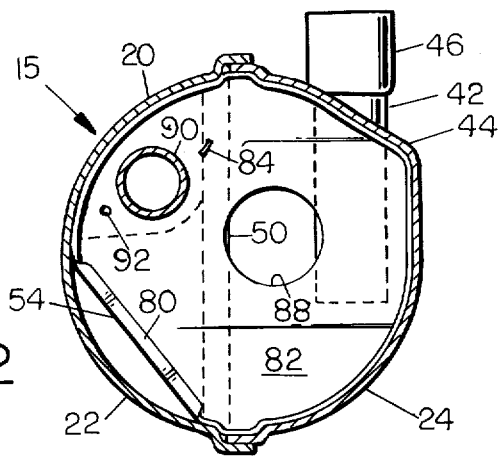
FIG. 2 is a sectional plan view taken along lines 2—2 of FIG. 1.
Figure 3:
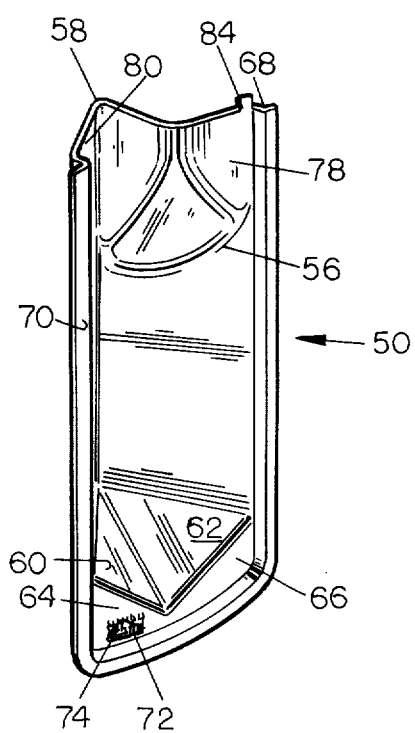
FIG. 3 is a perspective view showing the configuration of the internal weir member.
Figure 1:
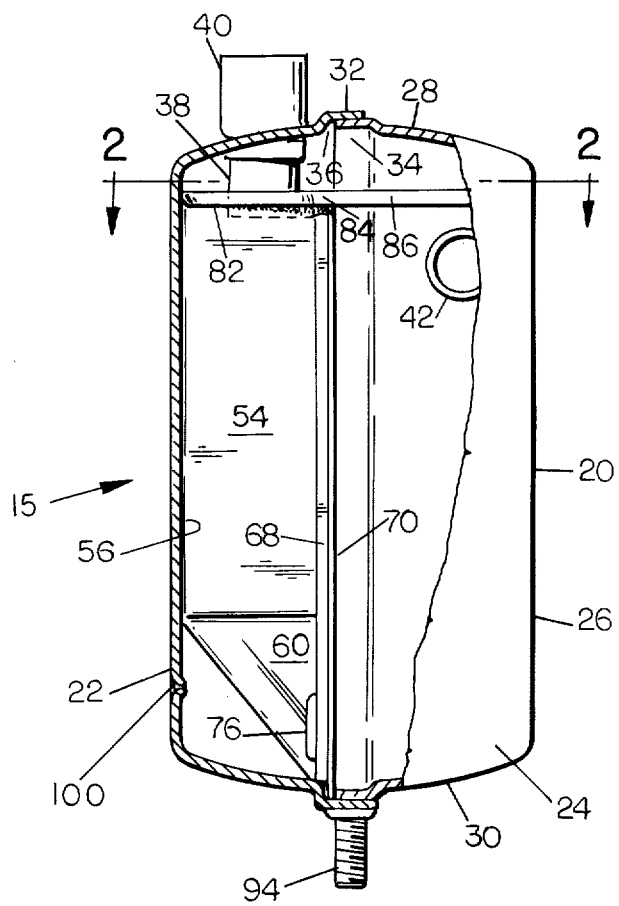
FIG. 1 is an elevation view of a preferred embodiment of a suction accumulator type pressure vessel with outer parts broken away to show interior details.

The suction accumulator embodiment illustrated in the drawings has a vessel that is fabricated from sheet metal parts and is designed to withstand the pressure differentials anticipated during operation of the refrigerant-evaporating system in which it is incorporated. Preferably the accumulator has a generally cylindrical midsection or body with rounded top and bottom ends but different shaped vessels including ones having generally rectangular bodies and planar ends may be used but usually require stronger materials or reinforcing. For ease of description the accumulator vessel disclosed herein will be described in its normal orientation with its greatest dimension being vertically disposed.

Suction accumulator 15 shown in FIGS. 1-4 has a pressure vessel 20 formed of two substantially symmetrical half sections 22, 24 produced from sheet metal by stamping processes. The half sections when joined together form a vessel that has a vertically disposed generally cylindrical midsection 26 with convex top 28 and bottom 30 ends. Preferably the half sections 22, 24 are joined together by overlapping seam means produced by lapping the marginal edge 32 of one of half section 22 over the marginal edge 34 of the other half section 24 (FIGS. 2 and 4) and then securing the overlapping marginal edges 32, 34 together as by copper brazing in a furnace containing a protective atmosphere at a temperature on the order of 2000° F., thereby creating a strong fluid tight seam. One marginal edge 32 may be offset laterally outward to provide an internal ledge 36. In this embodiment both marginal edges 32, 34 are laterally offset and the seam extends around the vessel lengthwise. Preferably the seam lies in a plane containing the longitudinal axis of the vessel which axis is vertically disposed when the vessel is installed. However, for the purpose of this invention it is only essential that the pressure vessel be made from two or more parts metallurgically joined together by seam brazing in a furnace. A vertically disposed outlet pipe fitting 38 having its axis parallel with the cylindrical axis of the vessel is sealed in an extrusion-pierced, collared aperture in the top portion of vessel half section 22. The outer end 40 of the outlet fitting 38 is enlarged to form the female member of a sweat-type connecting means for receiving the outer end of a suction line of a mechanical compressor. The inlet pipe fitting 42 is contained in an extrusion-pierced, collared aperture extending through a bulbous or nose portion 44 formed in the cylindrical wall of vessel half section 24 adjacent its top end. Inlet fitting 42 is horizontially disposed and tangentially positioned with respect to the cylindrical surface of half section 24 so that incoming fluid will be introduced to a cylindrical surface and caused to flow around the vessel axis and passed the flat surfaces of a weir member 50 contained in the opposite half section 22. The inner end of the inlet fitting 42 is cut at a right angle to the fitting axis. The outer end 46 of inlet fitting 42 is enlarged to form the female member of a sweat type connecting means for the compressor return line from the refrigerant evaporator.

A non planar weir member formed by stamping processes is positioned verticaly inside the vessel with its bottom and side edges sealingly attached to the inner surface of the vessel to thereby form an outlet passageway or flume on one side of the weir member and a fluid reservoir on the other side thereof. The vertically disposed weir member 50 is wholly contained in vessel half section 22 and is shaped so that a generally U-shaped outlet flume having two upright legs with a connecting leg at their bottom ends is formed conjointly by the weir member and the confronting wall of vessel half section 22. The upper portion of the weir member 50 defines the upright legs of the outlet flume by means of two generally planar rectangular panel sections 54, 56 integrally connected together along a vertical fold or ridge 58 that abuts the vessel wall FIGS. 1, 2 and 3. These panel sections 45, 56 terminate above the bottom end of the vessel but have integrally connected triangular panel extensions 60, 62 that are angled away from the vessel wall FIG. 1 and integrally joined together in the shape of a half pyramid FIG. 3. Two coplanar wing sections 64, 66 FIG. 3 depending from the panel extensions 60, 62 span the spaces between the lower ends of the panel extensions and the adjacent wall of vessel half section 22. The wing sections 64, 66 and panel extensions 60, 62 jointly define the inner wall of the connecting leg of the U-shaped outlet flume. The outer edges of panel sections 54, 56 and wing sections 64, 66 lie in a common plane and respectively contact the sides and bottom walls of the vessel half section 22. Preferably the marginal edge along the sides and bottom of weir member 50 has a rim band section 68 that fits in tight conformity with adjoining wall surface of the vessel half section 22 and extends from the panel and wing sections towards the seam offset or ledge 36 where it terminates in a laterally outwardly extending retaining a lip 70 which rests on ledge 36, for example see FIG. 4.

A liquid bleed-through or metering aperture 72 having a diameter of 1/16 inch for example, but which may be larger or smaller depending upon the size of the system, is located at the bottom end of weir member 50 in the vertically disposed wing section 64. Preferably the aperture 72 and an area around the aperture are recessed away from the reservoir side of the wing section so that when a screen member 74 is affixed over the recessed area 76, such as by projection welding, a multiplicity of screen openings are available to the recessed area FIG. 5. The screen openings are smaller in size than the metering aperture 72 so they will not allow passage of a particle that is large enough to clog or become lodged in the metering aperture. This vertically screened recess is particularly effective in keeping the metering aperture open and allowing liquid including lubricant oil to flow at a metered rate from the reservoir side to the flume side of the weir.

The top of the outlet leg of the outlet flume is enlarged by forming at the top of weir panel 56 a bulbous section 78 that extends under and slightly beyond the vertically disposed outlet fitting 38 in the top of vessel 20. Preferably this bulbous section 78 is streamlined as much as is possible so that the incoming refrigerant liquid does not splash excessively in a vertical direction either upwardly or downwardly. The top of panel 54 defining the inlet leg of the outlet flume has a narrow lip 80 that extends over an edge of a horizontially disposed baffle plate 82. A vertically projecting twist tab 84 is provided on the top edge of outlet leg panel 56 to locate and hold baffle plate 82 in position on weir member 50 during assembly.

Baffle plate 82 is shaped to conform with the cross sectional shape of the inside of vessel 20 level with the top of weir member 50 but excluding the area over the top of the inlet leg of the flume which is left open. The edge of the baffle 82 along the inlet leg opening fits under weir lip 80. An upturned peripheral rim 86 extends around the remaining edge of baffle 82 and provides a broad surface for sealing the baffle to the vessel wall. A large diameter opening 88 adjacent the center of the baffle plate forms the primary fluid outlet from the reservoir to the flume. Preferably this opening is not centered on the vessel axis but is offset towards the inlet fitting 42 and upstream from the inner end of the fitting 42 so that the entire opening is upstream from this inner end. The area of this primary opening as well as the cross sectional area of the flume passageways are sized so that they are all larger than the area of the vessel inlet or outlet. A second aperture 90 is located between the primary baffle opening and the vessel wall concentrically aligned with the outlet fitting 38. Preferably the inside diameter of aperture 90 is slightly greater than the outside diameter of outlet fitting 38 for ease of assembly but this over-sizing may be made sufficiently greater to provide an annular clearance space to serve as a pressure equalization means inside the vessel. An auxiliary equalization aperture 92 FIG. 2, may also be provided, but the total open area for pressure equalization should not be so large that it amounts to a bypass of the liquid pickup section of the flume. A slot to receive twist tab 84 is also pierced through the baffle plate at an appropriate location. The baffle plate 82 is positioned on top of weir member 50 such that when the baffle-weir assembly is seated in the vessel the inner ends of the vessel inlet and outlet fittings 38, 42 are below the bottom of the plate 82.

The thermally releasable safety plug 100 is formed in the wall of one of the vessel shell members 20 or 22 by penetrating the shell wall with a pointed conical punch 102 to produce an apertured well 104 having a wall taper which converges towards the inside of the vessel preferably at an angle 30° with respect to the punch axis or well axis 106. The penetration of the punch is controlled so as to produce a ragged edged aperture 108 having a nominal diameter of between 0.04 and 0.06 of an inch. It is essential that the open area of the aperture not be substantially greater than the area of a 0.065 diameter circle. A larger area aperture would permit the melted plug metal to flow downwardly out of the well during the furnace brazing operation. If a larger pressure relief vent is needed in a pressure vessel, one or more additional safety plugs spaced from each other can be used to achieve the total vent area required.

Figure 5:
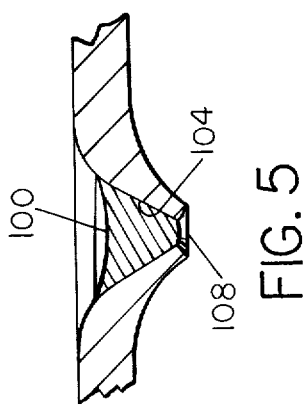
FIG. 5 is an enlarged fragmentary sectional view of the safety plug located in the lower end of shell member shown on the left side of FIG. 1.
Figure 6:
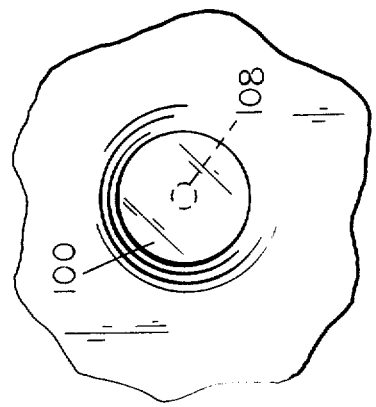
FIG. 6 is a side view of the fragmentary section shown in FIG. 5.
Figure 7:
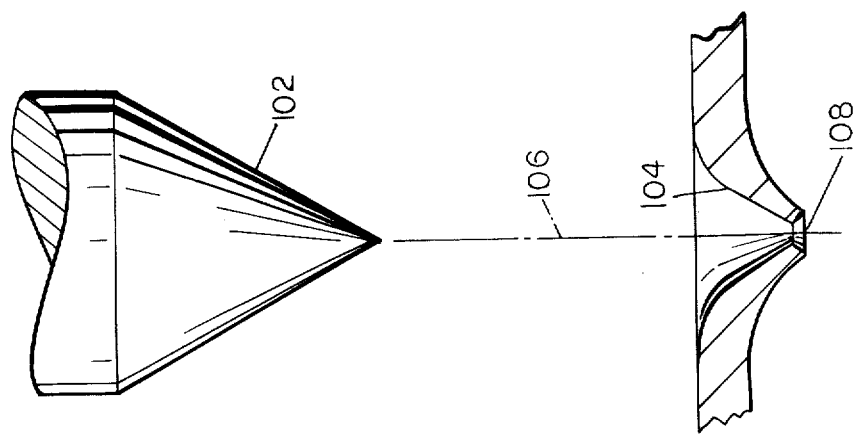
FIG. 7 is a fragmentary view similar to FIG. 5 showing the well punch and the apertured frusto conical well without the low melting temperature plug.

After the plug well 104 is formed, the pressure vessel components are assembled together, one or more copper brazing rod segments are appropriately positioned inside the vessel and it is placed on its side on a furnace conveyor belt or in a furnace so that the plug well is on top with its well axis 106 being vertically disposed. A low melting point metal pellet, such as a lead shot preferably of a size slightly less than that required to completely fill the well, is deposited in the well prior to the brazing operation. Other low melting point metals and alloys may be used in place of lead shot provided the boiling point of the selected metal is less than the temperature required for the seam brazing. The thus assembled pressure vessel components are then heated to a brazing temperature on the order of 2000° F. in a protective atmosphere to simultaneously produce a strong copper brazed seam and a homogeneous metal plug. The brazing temperature in this instance was over three times the melting point temperature of the plug metal. A furnace atmosphere normally used for copper brazing was found to be completely satisfactory without any alteration. Plugs formed in this manner were found to be fluid impervious and strongly bonded to the steel surface of the well. The exposed outer surface of the plug was in the form of a concave meniscus as is best seen in FIG. 5.

Under the disclosed furnace conditions, it is not feasible to use a larger diameter apertured well closed first by a steel ball and sealed therein by means of a low melting point metal, such as the type disclosed in U.S. Pat. No. 2,171,588 of Mc Guffey issued Sept. 5, 1939. The protective atmosphere and high temperature of the brazing operation enhance bonding of the metal parts to one another so that the steel ball tends to become stuck or adhered in the vent opening thereby inhibiting reliable release of the safety plug.

In addition to the ease and economy of manufacturing the thermally releasable safety plug in a fabricated pressure vessel, this invention also insures that a pressure vessel requiring a safety release plug will be so equipped with one because it is integrally formed in the wall of the pressure vessel at the time of manufacture rather than being supplied separately for installation at a later date.

While the invention has been described and illustrated with respect to a suction accumulator type pressure vessel, it is to be understood that the teachings disclosed herein can be applied to other pressure vessels and that various modifications of the above will be apparent to those skilled in the art without departing from the scope of the invention which is primarily defined by the appended claims.

I claim:

1. A method of producing a fabricated pressure vessel having an integrally formed thermal release plug, said method comprising the steps of: forming the shell of a pressure vessel from at least two sheet metal members having an overlappping seam, producing at least one apertured well in the wall of one of said members, placing a low melting point metal pellet in said well, placing at least one piece of seam brazing metal adjacent said seam, said brazing metal having a higher melting point than said metal pellet, placing the components in a brazing furnace having a protective atmosphere, and heating said components to brazing temperature to concurrently form a pressure vessel with a brazed seam and a thermal release safety plug.

2. A method according to claim 1 wherein said brazing temperature is at least three times greater than said plug metal melting point temperature.

* * * * *